US011280717B2

(12) United States Patent  
Goradia et al.

(10) Patent No.: US 11,280,717 B2  
(45) Date of Patent: Mar. 22, 2022

(54) METHODS AND APPARATUS FOR DETECTION AND ANALYSIS OF NANOPARTICLES FROM SEMICONDUCTOR CHAMBER PARTS

(71) Applicant: APPLIED MATERIALS, INC., Santa Clara, CA (US)

(72) Inventors: Prerna Goradia, Mumbai (IN); Avishek Ghosh, Mumbai (IN); Robert Jan Visser, Menlo Park, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 456 days.

(21) Appl. No.: 15/805,725

(22) Filed: Nov. 7, 2017

(65) Prior Publication Data

US 2018/0128744 A1 May 10, 2018

Related U.S. Application Data

(60) Provisional application No. 62/418,679, filed on Nov. 7, 2016.

(51) Int. Cl.
*G01N 21/64* (2006.01)
*G01N 21/65* (2006.01)
(Continued)

(52) U.S. Cl.
CPC .... *G01N 15/1434* (2013.01); *B01L 3/502715* (2013.01); *B01L 3/502761* (2013.01);
(Continued)

(58) Field of Classification Search
CPC ............... G01N 21/6428; G01N 21/65; B01L 3/502715; B01L 3/502761
See application file for complete search history.

(56) References Cited

U.S. PATENT DOCUMENTS 5,343,289 A  *  8/1994  Crawford ................. G01J 3/36  
356/328  
5,422,925 A     6/1995  Komatsu et al.  
(Continued)

FOREIGN PATENT DOCUMENTS

| KR | 10-0570308 B1 | 4/2006 |
| KR | 10-2009-0039553 A | 4/2009 |
| KR | 10-1639527 B1 | 7/2016 |

OTHER PUBLICATIONS

International Search Report and Written Opinion dated Mar. 7, 2018 for PCT Application No. PCT/US 2017/060401.

(Continued)

*Primary Examiner* — Brian R Gordon  
*Assistant Examiner* — Dwan A Gerido  
(74) *Attorney, Agent, or Firm* — Moser Taboada (57) ABSTRACT

Methods and apparatuses for identifying contaminants in a semiconductor cleaning solution, including: contacting a semiconductor cleaning solution with a semiconductor manufacturing component to form an effluent including one or more insoluble analytes-of-interest; contacting the effluent including one or more insoluble analytes-of-interest with an optical apparatus configured to sense fluorescence and, optionally, Raman signals from the one or more insoluble analytes-of-interest, wherein the apparatus includes an electron multiplying charged couple device and a grating spectrometer to spectrally disperse the fluorescence and project the fluorescence on to the electron multiplying charged couple device; and identifying the one or more analytes of interest.

17 Claims, 7 Drawing Sheets

(51) Int. Cl.
  *G01N 15/14*   (2006.01)
  *B01L 3/00*    (2006.01)
  *C11D 11/00*   (2006.01)
  *G01N 27/403*  (2006.01)
  *G01N 21/94*   (2006.01)
  *G01N 15/00*   (2006.01)

(52) U.S. Cl.
  CPC .......... *C11D 11/0047* (2013.01); *G01N 15/14* (2013.01); *G01N 21/6428* (2013.01); *G01N 21/6458* (2013.01); *G01N 21/65* (2013.01); *G01N 27/403* (2013.01); *B01L 2300/0627* (2013.01); *B01L 2300/0822* (2013.01); *G01N 15/1459* (2013.01); *G01N 21/94* (2013.01); *G01N 2015/0038* (2013.01); *G01N 2015/1486* (2013.01); *G01N 2021/6417* (2013.01); *G01N 2021/6439* (2013.01)

(56) References Cited

U.S. PATENT DOCUMENTS

| | | | |
|---|---|---|---|
| 6,051,124 | A | 4/2000 | Aoki |
| 7,692,783 | B2 | 4/2010 | Lundquist et al. |
| 9,383,260 | B1* | 7/2016 | Yoo .................. B23K 26/03 |
| 2002/0148485 | A1 | 10/2002 | Taft et al. |
| 2008/0030628 | A1* | 2/2008 | Lundquist .............. G01J 3/02 348/751 |
| 2008/0035609 | A1 | 2/2008 | Kashkoush et al. |
| 2009/0117666 | A1* | 5/2009 | Mpock ............ G01N 33/54313 436/501 |
| 2009/0291567 | A1 | 11/2009 | Hachigo et al. |
| 2010/0290018 | A1 | 11/2010 | True |
| 2011/0175185 | A1* | 7/2011 | Asher ............... H01L 27/14621 257/432 |
| 2012/0048737 | A1 | 3/2012 | Yamaguchi et al. |
| 2012/0216833 | A1 | 8/2012 | Wang et al. |
| 2017/0016770 | A1* | 1/2017 | Heussler .............. G01J 3/4531 |
| 2017/0038358 | A1* | 2/2017 | Mori .................... G01N 21/59 |

OTHER PUBLICATIONS

International Search Report and Written Opinion dated Feb. 21, 2018 for PCT Application No. PCT/US2017/060404.
Search Report for Taiwan Invention Patent Appliestion No. 106138471, dated Feb. 9, 2021.
Search Report for Taiwan Invention Patent Appliestion No. 106138471, dated Jun. 24, 2021.

* cited by examiner

FIG. 5B

METHODS AND APPARATUS FOR DETECTION AND ANALYSIS OF NANOPARTICLES FROM SEMICONDUCTOR CHAMBER PARTS

CROSS-REFERENCE TO RELATED APPLICATIONS

This application claims the benefit of U.S. Provisional Patent Application No. 62/418,679, filed with the United States Patent Office on Nov. 7, 2016, which is herein incorporated by reference in its entirety.

FIELD

Embodiments of the present disclosure generally relate to particle detection and, in particular to analysis and detection of nanoparticles in a liquid from a semiconductor manufacturing component.

BACKGROUND

As semiconductor substrate processing moves towards increasingly smaller feature sizes and line-widths, the importance of masking, etching, and depositing material on a semiconductor substrate with greater precision increases.

However, as semiconductor features shrink the size of contaminant particles which can render the device inoperable, becomes smaller and more difficult to remove, for example, particles that are less than 50 nm in diameter, for example 10 to 30 nm in diameter (i.e. nanoparticles). As a result, monitoring and chemically-specific characterization of nanoparticles is imperative in understanding the nature and origin of microscopic defects and contaminants affecting semiconductor manufacturing tools and semiconductor manufacturing chamber components.

A typical semiconductor manufacturing chamber component cleaning process involves immersing a chamber component in a liquid cleaning solution and analyzing a sample of the cleaning solution to determine particle characteristics, such as the number of particles (particle count) and the composition of the particles (e.g. metal, oxides, ceramic, hydrocarbon, polymers).

In determining particle count, liquid particle counter (LPC) tools, which work on the principle of detecting laser scattering from nanoparticle, are used to determine the particle count in a cleaning solution. However, the inventors have observed that in some cases contaminant nanoparticles can agglomerate resulting in a false particle count when analyzed in an LPC tool. The inventors have determined that the surface properties of the nanoparticles (e.g. the specific charge of the nanoparticles) are a significant factor in agglomeration of the nanoparticles, and accordingly in accurately determining the nanoparticle count. However, LPC tools do not provide any information on the surface properties of the nanoparticles.

The surface properties of the nanoparticles in a substrate processing chamber component cleaning solution can be determined using a zeta potential tool. Zeta potential is a scientific term for electrokinetic potential in colloidal dispersions. The zeta potential is the electric potential in the interfacial double layer at the location of the slipping plane relative to a point in the bulk fluid away from the interface. In other words, zeta potential is the potential difference between the dispersion medium and the stationary layer of fluid attached to the dispersed particle.

Furthermore, current liquid particle counters (LPC) are capable of detecting particle sizes of about 50 nm that may be present in the eluent used in cleaning semiconductor process parts and tools. However LPC tools, which is based on dynamic light scattering (Rayleigh scattering), can only record the size distribution of scattering particles present in the eluent and cannot deduce the nature or chemistry of the contaminant particles.

Accordingly, the inventors have developed improved methods and apparatus for determining nanoparticle count, the zeta potential, and chemical characterization of the contaminant nanoparticles generated in semiconductor processes, in order to advantageously provide improved nanoparticle count information, by taking into account nanoparticle agglomeration and improved efficiency of nanoparticle count analysis.

SUMMARY

Methods and apparatuses for the analysis and detection of nanoparticles in a liquid from a semiconductor manufacturing component are provided herein. In some embodiments, a method of identifying contaminants in a semiconductor cleaning solution, includes: contacting a semiconductor cleaning solution with a semiconductor component to form an effluent comprising one or more insoluble analytes-of-interest; contacting the effluent comprising one or more insoluble analytes-of-interest with an optical apparatus configured to measure fluorescence and, optionally Raman signals from the one or more insoluble analytes-of-interest; and identifying the one or more analytes of interest.

In some embodiments, a method of identifying contaminants in a semiconductor cleaning solution, includes: contacting a semiconductor cleaning solution with a semiconductor manufacturing component to form an effluent including one or more insoluble analytes-of-interest; contacting the effluent including one or more insoluble analytes-of-interest with an optical apparatus configured to sense fluorescence and, optionally, Raman signals from the one or more insoluble analytes-of-interest, wherein the optical apparatus includes an electron multiplying charged couple device and a grating spectrometer to spectrally disperse the fluorescence and project the fluorescence on to the electron multiplying charged couple device, and identifying the one or more analytes-of-interest.

In some embodiments, an apparatus to chemically identify nanoparticles in a substrate processing chamber component cleaning solution, includes: a microfluidic flow cell; a tunable diode-pumped solid-state (DPSS) laser to provide an excitation beam; a microscope objective lens coupled, or proximate to a first side of the microfluidic flow cell to receive the excitation beam; a beam expander in a path of the excitation beam from the laser; a focusing lens in the path of the excitation beam from the laser, following the beam expander, to form a focused excitation beam; a dichroic mirror in the path of the focused excitation beam to reflect the excitation beam at a 90 degree angle towards the microscope objective lens and the microfluidic flow cell; a confocal pin-hole is positioned between the dichroic mirror and the microscope objective lens; a notch filter to pass fluorescence signal and Raman signal collected and collimated by the microscope objective lens; an intensified charge couple device (ICCD) to receive the fluorescence signal and Raman signal to form a fluorescence and Raman image; an electron multiplying charged couple device (EMCCD) to receive the fluorescence and Raman signal and form a fluorescence and Raman spectra; and a beamsplitter between the notch filter and the intensified charge couple device (ICCD) and the electron multiplying charged couple device (EMCCD) to direct the fluorescence image to the intensified charge couple device (ICCD) and the fluorescence and Raman spectra to the electron multiplying charged couple device (EMCCD), wherein a Raman filter is optionally positioned between the beamsplitter and the intensified charge couple device.

In some embodiments, a system for quantitative and qualitative analysis of analytes-of-interest, includes: a liquid particle counter in fluid communication with an apparatus configured to measure fluorescence and optionally Raman signal from one or more insoluble analytes-of-interest.

In some embodiments, a system for quantitative and qualitative analysis of analytes-of-interest, including: a liquid particle counter in fluid communication with an optical apparatus configured to sense fluorescence and, optionally, Raman signals from one or more insoluble analytes-of-interest, wherein the optical apparatus includes an electron multiplying charged couple device and a grating spectrometer to spectrally disperse the fluorescence and project the fluorescence on to the electron multiplying charged couple device. In embodiments, the apparatus is configured to sense Raman signals.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Methods and apparatuses for the analysis and detection of nanoparticles in a liquid from a semiconductor manufacturing component are provided herein. The inventive methods and apparatus described herein advantageously provide determination of both the particle count and the zeta potential of particles in a substrate processing chamber component cleaning solution in order to advantageously provide improved particle count information by taking into account particle agglomeration and improved efficiency of particle count analysis. Furthermore, the inventive methods described herein, based on nanoparticle fluorescence, Raman scatter light, and/or ion-selective electrodes for detection and chemical characterization of the contaminant nanoparticles generated in semiconductor processes, typically metals, metal ions, fluorides, nanoparticles from etching residue, polymer, organic metal polymer, etc., significantly improve detection and yield of chamber liner reactions or any other parasitic reaction between process gases that lead to coatings of undesirable non-volatile byproducts and contaminants on process tools and chambers. Moreover, quantitative and qualitative information obtained using methods and apparatuses of the present disclosure about contaminants from microelectronic manufacturing chambers and parts thereof may be used to modify cleaning solutions to enhance overall cleaning performance.

Figure 1:
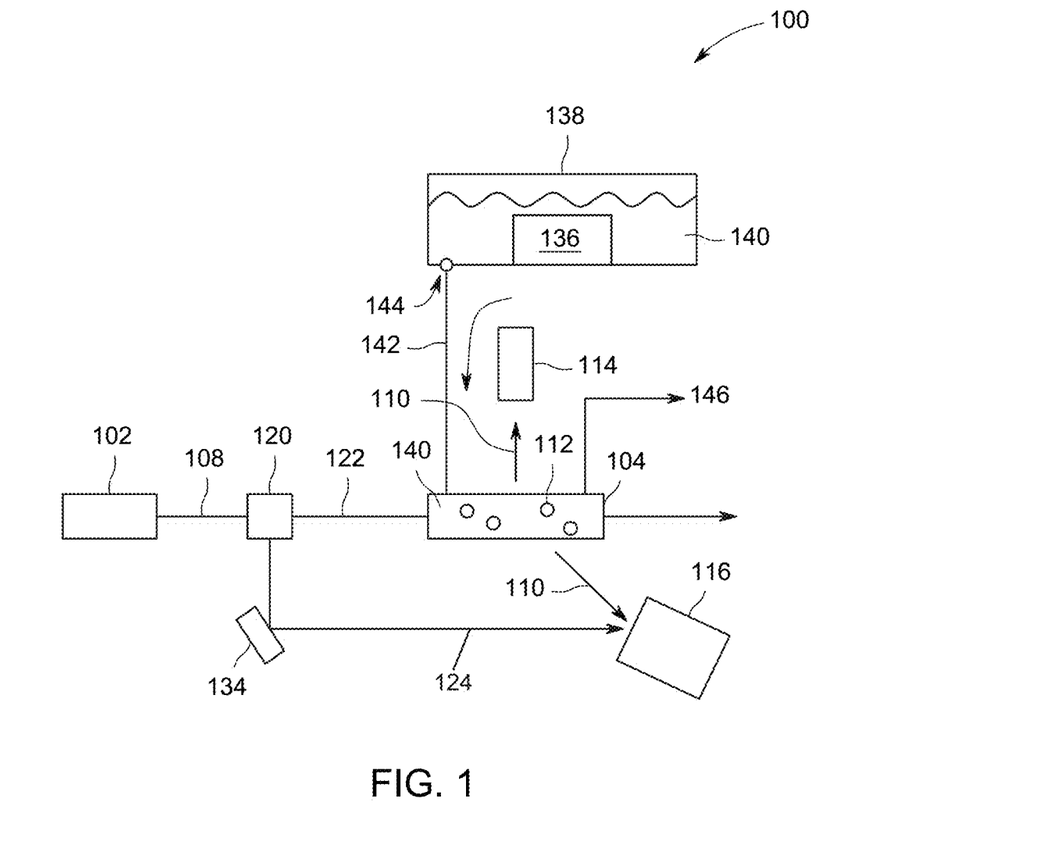
FIG. 1 depicts an apparatus to determine the zeta potential and the liquid particle count of particles in a substrate processing chamber component cleaning solution in accordance with some embodiments of the present disclosure.
Figure 2:
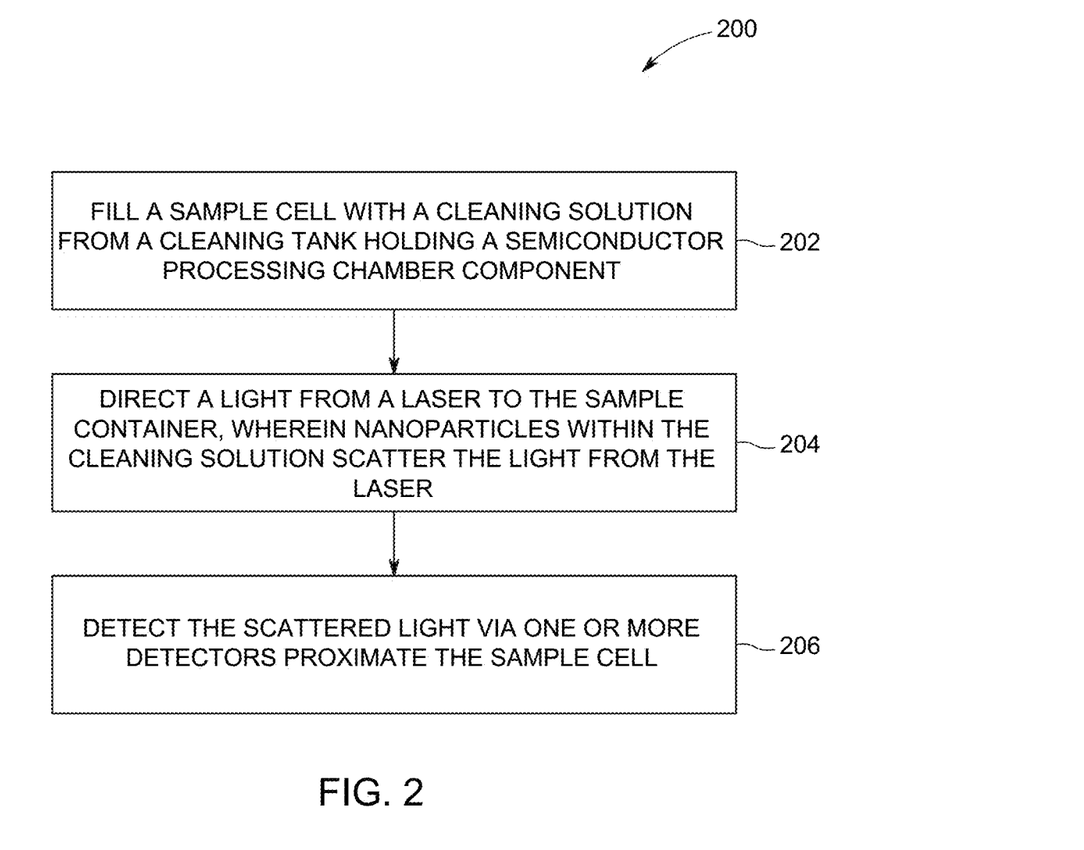
FIG. 2 depicts a flow chart of a method for determining the zeta potential and the liquid particle count of particles in a substrate processing chamber component cleaning solution in accordance with some embodiments of the present disclosure.

FIG. 2 depicts a flow chart of a method 200 for determination of both the particle count and the zeta potential of particles in a substrate processing chamber component cleaning solution in accordance with some embodiments of the present disclosure. Determining the zeta potential of the nanoparticles within a cleaning solution provides the nature of the nanoparticles (i.e.: the magnitude of the charge of the nanoparticles and the nature of the charge, such as positive, negative, or neutral). The nature of the nanoparticles helps to determine the ideal pH and formulation of the cleaning solution necessary to dislodge contaminant particles from the surface of the semiconductor processing chamber component and for the nanoparticles to remain dispersed in the cleaning solution. The method 200 may be performed, for example, in a suitable apparatus 100, such as is described below with respect to FIG. 1.

A semiconductor processing chamber component 136, such as a chamber liner, a chamber shield, or a susceptor, or aluminum part is placed in a cleaning tank 138 having a cleaning solution 140. The method 200 begins at 202 by filling a sample cell 104 with cleaning solution 140 from the cleaning tank 138 holding the semiconductor processing chamber component 136.

The cleaning solution 140 is transferred from the cleaning tank 138 via a first flow tube 142 having a first end coupled to an outlet 144 of the cleaning tank 138 and a second end coupled to the sample cell 104. Once the sample cell 104 is filled, the flow of cleaning solution 140 is stopped and the sample cell 104 is sealed. In some embodiments, the sample cell 104 comprises a tubular passage running horizontally or vertically through a base of the sample cell 104 from a first end, coupled to the second end of the first flow tube 142, to a second end opposite the first end. A second flow tube 146 is coupled to the second end of the sample cell 104 to discard the cleaning solution 140 from the sample cell 104 following analysis of the cleaning solution as described below.

Next, at 204, light (i.e. incident light 108) from a laser 102 is directed to the sample cell 104. The nanoparticles 112, moving within the cleaning solution due to Brownian motion, scatter the incident light 108 into scattered light 110. The frequency of the scattered light 110 is shifted from the incident light 108 in proportion to the speed of the nanoparticles 112 movement, thus allowing for determination of the electrophoretic mobility of the particles.

Next, at 206, the scattered light 110 is detected by one or more detectors. In some embodiments, the one or more detectors comprise two detectors 114, 116. In some embodiments, a first detector 114 can be positioned at 90 degrees to detect a scattered light 110 to determine the size and the molecular weight of the nanoparticles 112. The scattered light 110 is detected by the first detector 114 which outputs a voltage pulse. The larger the nanoparticle 112, the taller the corresponding output pulse. In some embodiments, a second detector 116 is positioned proximate the sample cell 104 to determine the zeta potential of the nanoparticles 112.

The apparatus 100 further comprises a first mirror 120 positioned between the output of the laser 102 and the sample cell 104. A first portion 122 of the incident light 108 passes through the first mirror 120 and continues toward the sample cell 104.

A second portion 124 of the incident light 108 is directed by the first mirror 120 away from the first portion 122 and into the second detector 116. For example, the second portion 124 is directed at a 90 degree angle (or about 90 degrees such as 70 degrees to 110 degrees) away from the first portion 122 and toward the second detector 116. Additional mirrors 134 or other reflectors may be used as necessary to direct the second detector 116. Since the frequency of the scattered light 110 is shifted from the incident light 108 in proportion to the speed of the nanoparticles 112 movement, the electrophoretic mobility of the particles and in turn the zeta potential can be measured from the frequency shift between the incident light 108 and the scattered light 110.

The above method using a light scattering methodology requires the cleaning solution 140 to be stationary (i.e. not flowing through) the sample cell 104. However, the inventors have observed that being able to determine particle count and zeta potential in-situ (i.e. as the cleaning solution is flowing through a detection tool) can increase efficiency and provide real-time data on the nature of nanoparticles within the cleaning solution.

Figure 4A:
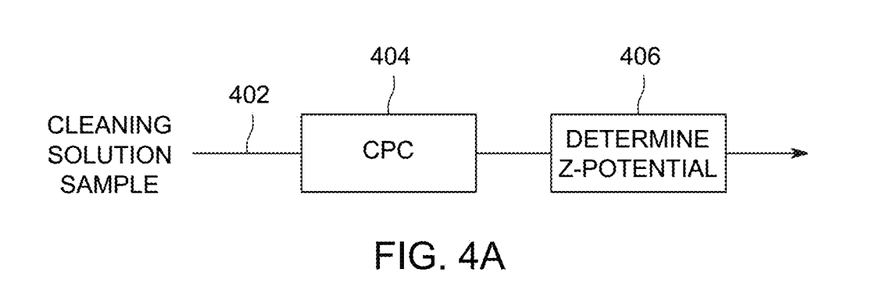
FIG. 4A-4C depicts an apparatus to determine the zeta potential of nanoparticles in a cleaning solution in accordance with some embodiments of the present disclosure.

FIG. 4A provides an in-line apparatus 400 to determine the zeta potential of nanoparticles in a cleaning solution. As depicted in FIG. 4A, a sample of cleaning solution 402 passes through a LPC tool 404 to determine nanoparticle count in the cleaning solution 402. The LPC tool 404 can be any suitable commercially available LPC tool. The cleaning solution 402 then passes through apparatus 406, such as apparatus 100, to determine the zeta potential of the nanoparticles in the cleaning solution 402.

Figure 4B:
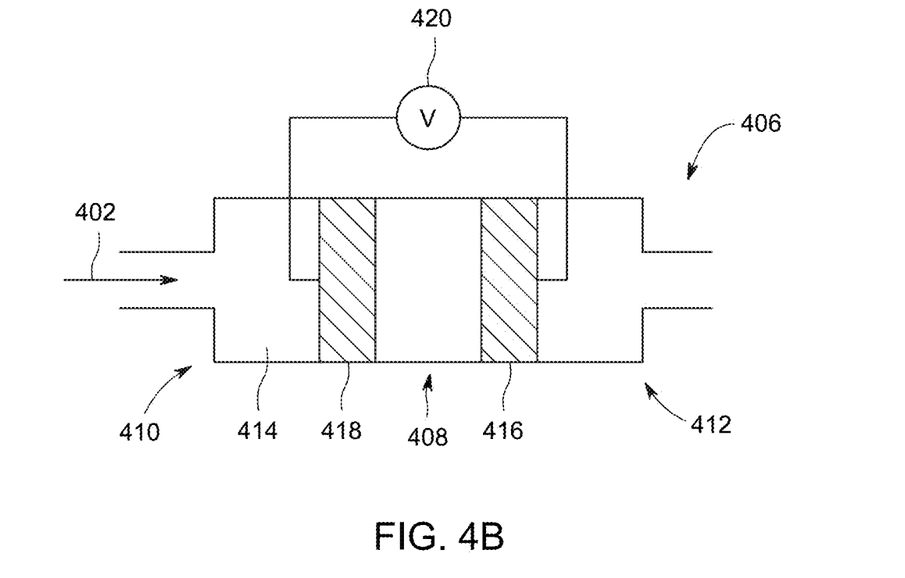

Apparatus 406, as depicted in FIG. 4B, may comprise a sample cell 408 having a first end 410 and second end 412 opposite the first end 410. The cleaning solution 402 exiting the LPC tool 404 enters the sample cell 408 at the first end 410. The sample cell 408 comprises a tubular passage 414 running horizontally through the sample cell 408 from the first end 410 to the second end 412. The tubular passage 414 comprises opposing electrodes (i.e., electrode 416 may be an anode and electrode 418 may be a cathode) coupled to a power supply 420. As the cleaning solution 402 passes between the electrodes 416, 418, the nature (positive, negative, neutral) and magnitude of the charge of the nanoparticles will determine the attraction to, and level of attraction of, the nanoparticle to the electrodes 416, 418.

Figure 3A:
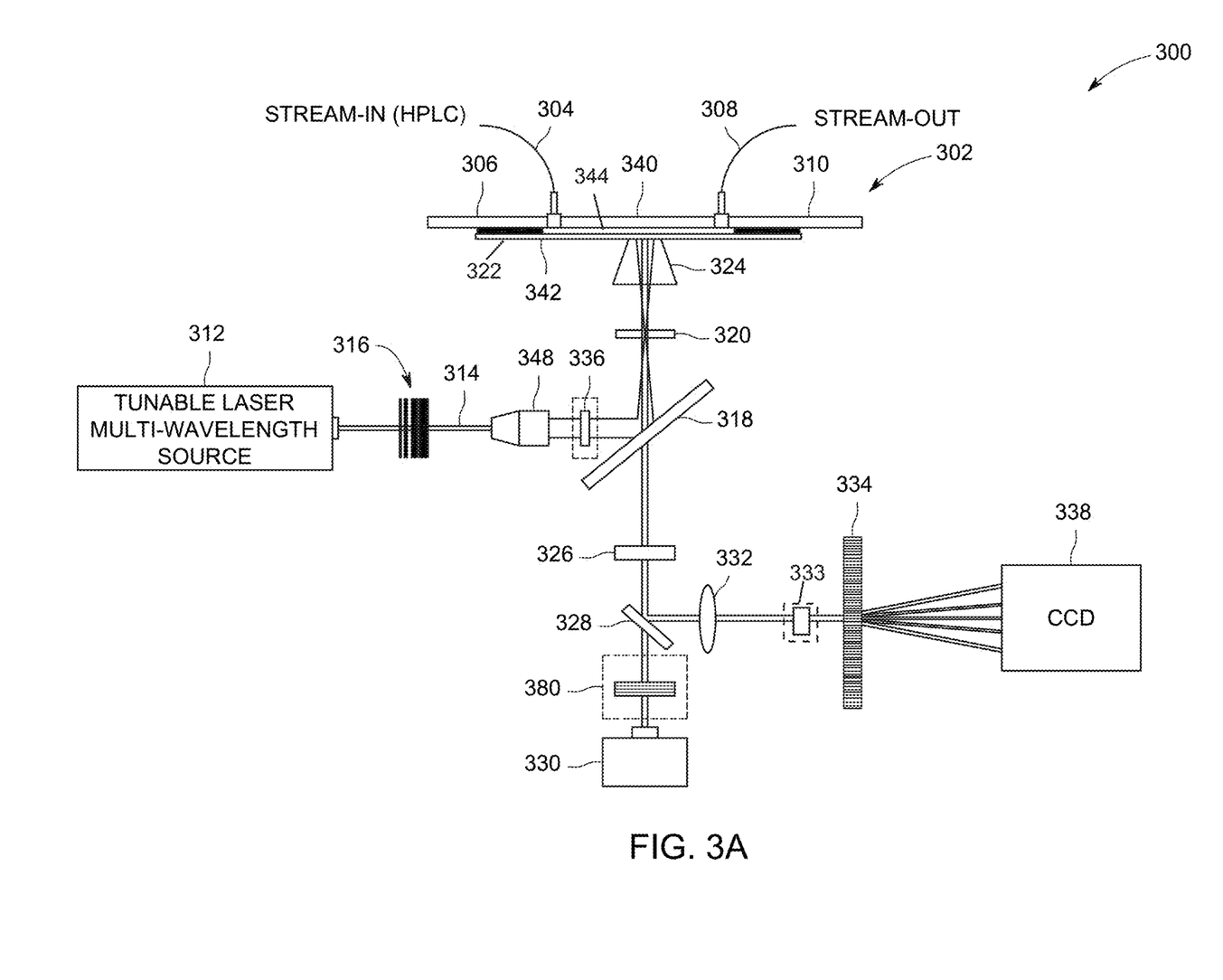
FIG. 3A-3E depicts an apparatus to chemically identify nanoparticles in a substrate processing chamber component cleaning solution in accordance with some embodiments of the present disclosure.

FIG. 3A-3E depicts an apparatus 300 to chemically identify nanoparticles in a substrate processing chamber component cleaning solution in accordance with some embodiments of the present disclosure. As depicted in FIG. 3A, the inventors have provided an apparatus 300 for single molecule fluorescence imaging and spectroscopy that can be used to chemically identify nanoparticles.

Figure 3B:
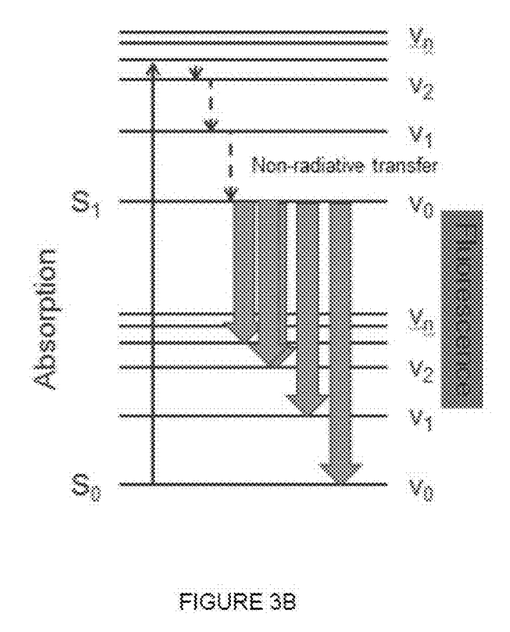

Fluorescence and Raman imaging are optically sensitive methods of chemically identifying nanoparticles that are present in a solution such as ultrapure water, or cleaning solution which may be used in an LPC system. As depicted in FIG. 3B, the absorption of radiation in UV-Visible wavelength (i.e. 200-500 nm) excites molecules to higher excited electronic states (e.g. from $S_0$ (ground) to $S_1$, $S_2$, $S_3$, ... $S_n$). The excited molecules can then either relax to the ground state $S_0$ directly or to lower states through radiationless energy transfer. Fluorescence emission occurs only from $S_1$ to $S_0$. Maximum fluorescence occurs when a molecule is excited at the excitation wavelength. Usually fluorescence occurs at a wavelength, significantly red-shifted from the excitation wavelength. Metal nanoparticles such as those that exhibit strong plasmonic resonances (e.g., copper, gold, aluminum) show distinct fluorescence emissions when excited at their specific excitation wavelengths in the UV-Visible region with a tunable laser, and are thus detectable and identifiable using methods and apparatuses of the present disclosure.

Figure 3C:
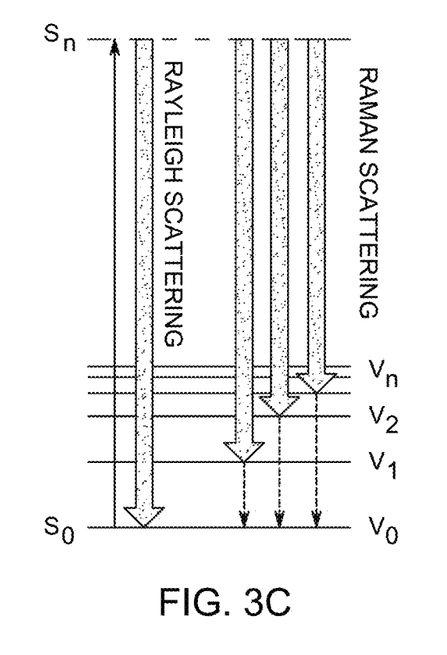

As depicted in FIG. 3C Raman scattering may occur from a higher excited state to a resonant vibrational state of the ground electronic state as a result of inelastic scattering of light by excited molecules, causing a shift in the spectrum, unique for different materials such as contaminants or analytes-of-interest. In embodiments of the present disclosure, non-metals may exhibit Raman scattering signals which can be detected by the apparatus 300 of FIG. 3A by optionally including an appropriate notch spectral filter 380.

Figure 3D:
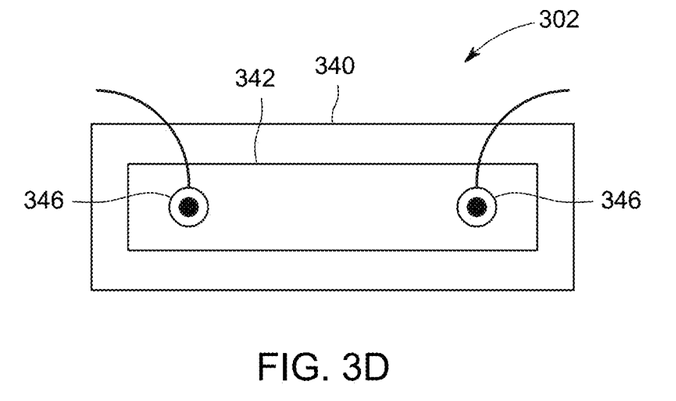
Figure 3E:
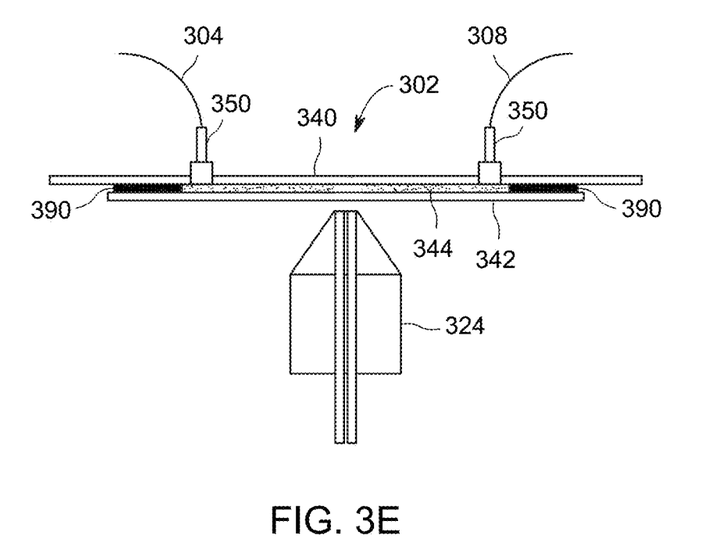

Returning to FIG. 3A, the apparatus 300 comprises a microfluidic flow cell 302. The microfluidic flow cell 302 has an inflow tube 304 coupled to a first end 306 and an outflow tube 308 at a second end 310 to carry a cleaning solution having nanoparticles into and out of the microfluidic flow cell 302. As depicted in FIGS. 3D and 3E, the microfluidic flow cell 302 comprises of a glass or quartz glass slide 340 on to which a Corning #1 glass or quartz (thickness<150 um) cover slip 342 is fixed with a spacer 390 in between, thus creating an empty volume 344 for the liquid to flow through. Two 1.4 mm diameter holes 346 are drilled at the two long ends on the central part of the glass slide 340 such that these holes 346 open to the central hollow between the glass slide 340 and the cover slip 342 separated by the spacer. Two 1/16" HPLC tubes (inflow tube 304 and outflow tube 308) are attached with an adapter 350 on to the two drilled holes. As described above, the microfluidic flow cell includes a glass/quartz glass slide on to which a glass or quartz cover slip is fixed with a spacer in between to create an empty volume.

Returning to FIG. 3A, the apparatus 300 further comprises a tunable diode-pumped solid-state (DPSS) laser 312. The laser is a continuous wave laser providing less than 1 W power. The laser 312 is tunable in the UV-Visible region, such as between 200 to 500 nanometers, or between 200 to 410 nanometers, to excite different electronic excitation modes for different defect nanoparticles that flow across the excitation volume in microfluidic flow cell 302. The laser 312 provides coherent near-monochromatic light (i.e. an excitation beam 314) which passes through a beam expander 348 and optionally a focusing lens 336. The excitation beam 314 is directed from the laser 312 through a beam attenuator 316 such as one or more neutral density filters. A dichroic mirror 318, placed in the path of the focused excitation beam 314, reflects the beam at a 90 degree angle (or about 90 degrees such as between 70 degrees to 110 degrees) towards the microscope objective lens 324 (NA~1.5, 60-100x) and microfluidic flow cell 302. The dichroic mirror 318 has the property of reflecting lower wavelengths (excitation) and transmitting longer wavelengths (fluorescence/Raman). A confocal pin-hole 320 is positioned between the dichroic mirror 318 and the microscope objective lens 324. The confocal pin-hole 320 is placed at the focal length of focusing lens 336, so that high optical resolution and contrast is maintained by spatially filtering out the out-of-focus component of the excitation beam 314.

The excitation beam 314 is then directed to the microscope objective lens 324 coupled to the first side 322 of the microfluidic flow cell 302. The microscope objective lens 324 focuses the excitation beam into the microfluidic cell, creating an excitation volume within the flow cell. The nanoparticles flowing through the flow cell get excited within the excitation volume, subsequently emitting single molecule fluorescence radiation at specific wavelength(s) in the case of metal contaminants or metal analytes-of-interest, and Raman scattering light in the case of non-metal contaminants or analytes-of-interest. In embodiments, Raman scattering light will be detected by apparatus 300. The fluorescence/Raman emission is then collected and collimated by the microscope objective lens 324 and subsequently directed towards the image and spectral detection parts of the setup, through the dichroic mirror 318 and notch filter 326. In embodiments, notch filter 326 is preselected for imaging the fluorescence/Raman from single nanoparticle contaminants or analytes-of-interest. Preselection of the notch filter is facilitated by obtaining an emission and excitation spectrum by a fluorimeter (Perkin-Elmer Fluoromax-4) for each type of material nanoparticles or analytes-of-interest that are being investigated, such that the appropriate notch filter and excitation wavelengths can be selected correctly. In embodiments the notch filter is selected to remove excitation light. In embodiments, the notch filter is selected to pass fluorescence and Raman signal.

After transmitting through the notch filter 326, a beamsplitter (or flip mirror) 328 is placed between the notch filter 326 and the intensified charge couple device (ICCD) 330 in order to record the single nanoparticle fluorescence/Raman image and the spectrally dispersed fluorescence spectra onto separate charged couple device (CCD) sensors. In one beam path, the fluorescence/Raman image can be directly imaged by transmitting though spectral filter 380 on to the intensified charge couple device (ICCD) 330 such as a camera, where particle counting and sizing can be performed. In another beam path, in embodiments, the fluorescence/Raman is spectrally dispersed by a grating spectrometer 334, and is then projected on to the wavelength-calibrated pixels of the electron multiplying charged couple device (EMCCD) 338. In embodiments a grating spectrometer 334 is used to spectrally disperse the fluorescence and project the fluorescence on to the electron multiplying charged couple device. In embodiments, the electron multiplying charged couple device is disposed within a tunable grating spectrometer suitable to disperse fluorescence signal and Raman signal in a spectral frequency domain. In embodiments, grating spectrometer 334 is suitable for single particle spectroscopy. In embodiments, grating spectrometer 334 includes 1200 lines per millimeter. In embodiments, the grating spectrometer 334 is part of the electron multiplying charged couple device (EMCCD) 338. In embodiments, the grating spectrometer 334 and an electron multiplying charged couple device (EMCCD) 338 receive the fluorescence and Raman signal and form fluorescence and Raman spectra.

In embodiments, a lens 332, between the EMCCD 338 and the beamsplitter (or flip mirror) 328 can be used to focus fluorescence/Raman signals on the EMCCD image plane. The ICCD has high quantum efficiencies for high photon counts and is suitable for imaging purposes. Electron multiplying charged couple devices (EMCCDs) have high quantum efficiencies even for low photon counts, suitable for spectroscopy applications.

In embodiments, a slit hole 333, such as a 50 micrometer slit hole is optionally positioned between the lens 332 and grating spectrometer 334 in order to focus a point of light onto grating spectrometer 334.

In embodiments, some advantages of single molecule fluorescence/Raman imaging and spectroscopy in accordance with the present disclosure include: (1) single molecule nanoparticles are detectable in-flow (number of particles/cc/minute); (2) chemical specificity in distinct fluorescence/Raman spectral signatures; (3) fast acquisition times and high quantum efficiencies; (4) in static mode, nanoparticle size can be retrieved from Fluorescence/Photon Correlation Analysis; and (5) relatively easy to setup and package.

Figure 5A:
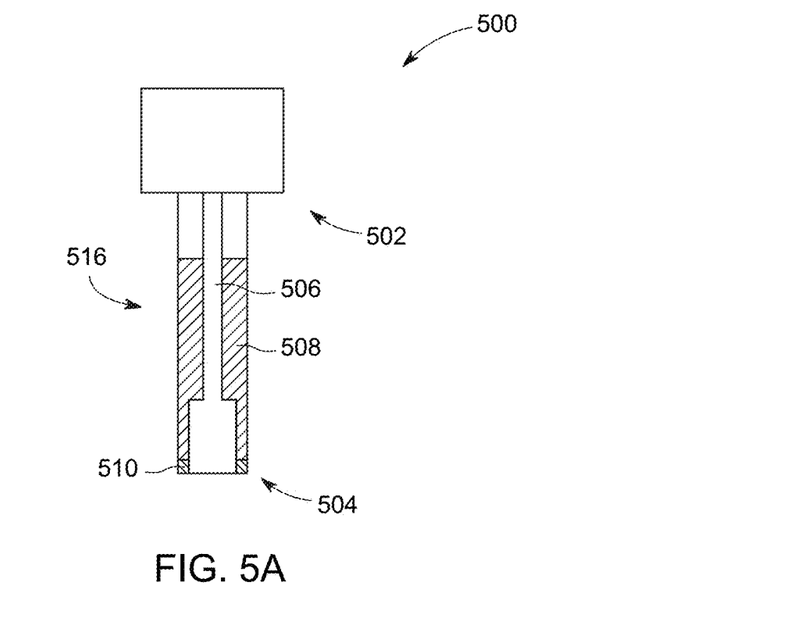
FIG. 5A depicts an apparatus for selective detection of fluorides that can be used to chemically identify nanoparticles in accordance with some embodiments of the present disclosure.

In another embodiment, depicted in FIG. 5A, the inventors have provided an apparatus 500 for selective detection of fluorides that can be used to chemically identify nanoparticles in accordance with some embodiments of the present disclosure. The apparatus 500 may be immersed in the cleaning solution 140 of a cleaning tank 138 holding the semiconductor processing chamber component 136. The apparatus 500 comprises a body 516 having a first end 502 and a second end 504 to be immersed in the cleaning solution. The body 516 is hollow and tubular shaped, comprising an electrode 506 (for example made of silver, or silver chloride) that is coupled to a single crystal membrane 510, and a chemical solution 508 within the body 516 (for example, sodium chloride or sodium fluoride).

Figure 5B:
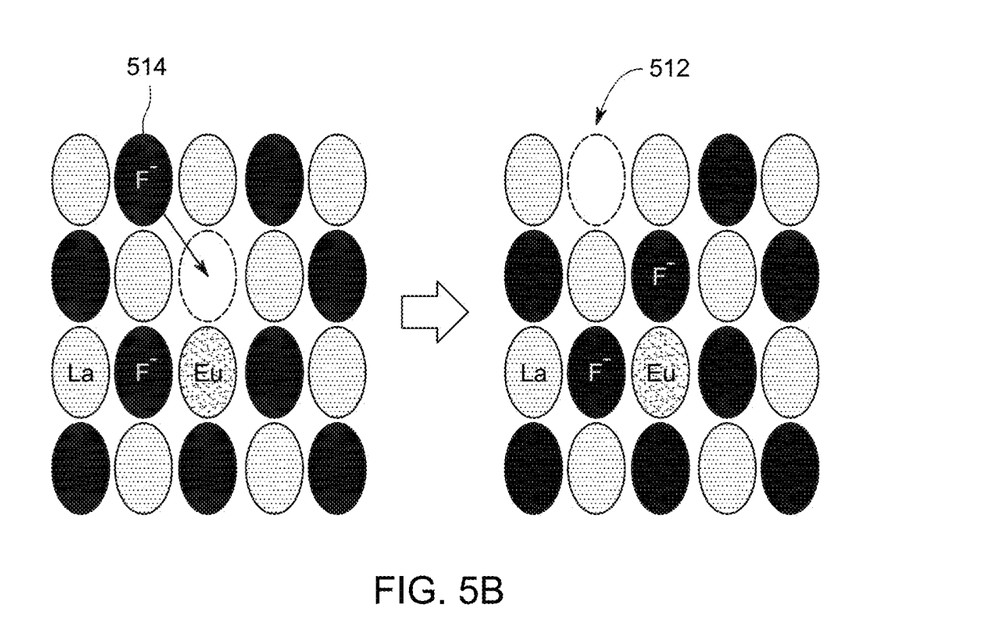
FIG. 5B schematically depicts the mobility of fluorine ions across lattice vacancies.

The single crystal membrane 510 can be, for example, $LaF_3$ doped with $EuF_2$ creating lattice vacancies 512. As depicted in FIG. 5B, the mobility of fluorine ions 514 across the lattice vacancies 512 leads to conduction which can be detected. The lattice vacancy size allows only for fluorine ions to move through the single crystal membrane 510. Similar apparatus can be used for other chemicals such as K+, Na+, Cl−, NH3, Ca2+, S2−, Ag+, Pb3+, Pb4+, NO2−, NO3−, CN−.

Figure 4C:
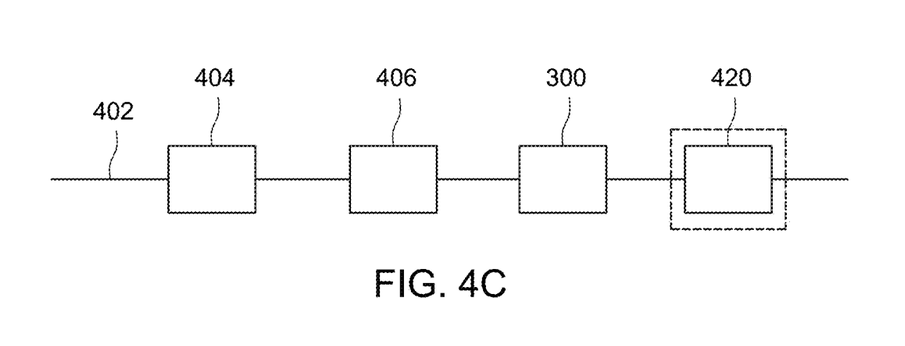

In embodiments, apparatus 500 is an ion selective electrode. Suitable ion selective electrodes include commercially available ion selective electrodes having known detection limits and detection specificity for one or more analytes-of-interest. In embodiments of the present disclosure an array of ion selective electrodes may be included in-line. Referring now to FIG. 4C, a sample of cleaning solution 402 passes through a LPC tool 404 to determine nanoparticle count in the cleaning solution 402. The LPC tool 404 can be any suitable commercially available LPC tool. The cleaning solution 402 then passes through apparatus 406 to determine the zeta potential of the nanoparticles in the cleaning solution 402. The cleaning solution 402 then passes through apparatus 300 to determine soluble particle types. Optionally, the cleaning solution may be further contacted with one or more ion selective electrodes 421 to identify soluble analytes-of-interest such as K+, Na+, Cl−, NH3, Ca2+, S2−, Ag+, Pb3+, Pb4+, NO2−, NO3−, CN−, F− ions.

In embodiments, methods of the present disclosure include methods of identifying contaminants in a semiconductor integrated circuit cleaning solution, including: contacting a semiconductor integrated circuit cleaning solution with an integrated circuit component to form an effluent including one or more insoluble analytes-of-interest; contacting the effluent comprising one or more insoluble analytes-of-interest with an apparatus configured to measure fluorescent and optional Raman signals from the one or more insoluble analytes-of-interest; and identifying the one or more analytes-of-interest. In embodiments, the one or more analytes of interest include one or more metals. Non-limiting examples of metals, such as metal contaminants, include copper, gold, aluminum, nickel, chromium, nichrome, germanium, silver, titanium, tungsten, platinum, tantalum, and combinations thereof. In embodiments, especially where a spectral filter such as spectral filter 380 is included, the one or more analytes of interest may include one or more non-metals. Non-limiting examples of non-metals include oxide, nitride, oxides of silicon, boron, and the like. In embodiments, analytes of interest include insoluble non-metal contaminants such as metal oxide, metal fluoride, nitride, and combinations thereof. In embodiments, the analytes-of-interest are insoluble, or suspended particles within a cleaning solution.

Methods in accordance with the present disclosure further include contacting effluent, such as a used cleaning solution, with one or more ion selective electrodes for Identifying soluble analytes-of-interest.

In embodiments, quantitative and qualitative information obtained on analytes-of-interest such as contaminants using methods and apparatuses of the present disclosure may be used to preselect, select, or modify cleaning solutions to enhance overall cleaning performance. In embodiments, such as where a cleaning solution shows a higher concentration of one or more identified contaminants, the cleaning solution can be modified to more effectively remove the identified contaminant. For example, if a metal contaminant is identified and found to be a metal having an electronegativity higher than silicon, a cleaning solution may be modified or selected to have a high redox potential value to enhance or promote the removal of such contaminants. If a metal contaminant is identified to be a metal with an electronegativity lower than silicon contamination may be found as a chemical oxide form and removed with diluted hydrofluoric add treatment. In embodiments, the cleaning solution may be modified by adjusting the pH of the cleaning solution, adding chelators, surfactants and the like to selectively target the identified contaminant to enhance removal thereof from a soiled part.

In embodiments, a method of identifying contaminants in a semiconductor cleaning solution is provided including: contacting a semiconductor cleaning solution with a semiconductor manufacturing component to form an effluent comprising one or more insoluble analytes-of-interest; contacting the effluent including one or more insoluble analytes-of-interest with an optical apparatus configured to sense fluorescence and, optionally, Raman signals from the one or more insoluble analytes-of-interest, wherein the apparatus includes an electron multiplying charged couple device (such as 338) and a grating spectrometer (such as 334) to spectrally disperse the fluorescence and project the fluorescence on to the electron multiplying charged couple device; and identifying the one or more analytes of interest.

While the foregoing is directed to embodiments of the present disclosure, other and further embodiments of the disclosure may be devised without departing from the basic scope thereof.

The invention claimed is:

1. A system for quantitative and qualitative analysis of analytes, comprising: a cleaning tank that holds a liquid cleaning solution and a semiconductor processing chamber component: a flow cell having a first end and a second end that carries the liquid cleaning solution into and out of the flow cell, respectively; and an optical apparatus configured to direct an excitation beam toward the flow cell and to split an excitation beam reflected from the flow cell into two paths to sense fluorescence and Raman signals from one or more analytes suspended in the liquid cleaning solution, wherein the optical apparatus comprises an intensified charge coupled device on a first beam path to perform imaging of the fluorescence and Raman signals for particle counting and sizing and an electron multiplying charge coupled device and a grating spectrometer on a second beam path to spectrally disperse the fluorescence and project the fluorescence onto the electron multiplying charge coupled device for particle identification.

2. The system of claim 1, wherein the semiconductor processing chamber component is at least one of a chamber liner, a chamber shield, a susceptor, or an aluminum part.

3. The system of claim 1, wherein the one or more analytes are suspended particles.

4. The system of claim 1, wherein the grating spectrometer includes 1200 lines per millimeter.

5. The system of claim 1, wherein the electron multiplying charged couple device is disposed within a tunable grating spectrometer suitable to disperse the fluorescence signal and Raman signal in a spectral frequency domain.

6. The system of claim 1, further comprising a beam splitter configured to split the excitation beam reflected from the cell into the two paths.

7. The system of claim 1, further comprising a notch spectral filter on the first beam path and configured to transmit the fluorescence and Raman signals onto the intensified charge couple device.

8. The system of claim 1, further comprising a tubular passage running horizontally through the flow cell from the first end to the second end.

9. The system of claim 1, further comprising one or more ion selective electrodes.

10. The system of claim 9, wherein the one or more ion selective electrodes are suitable for detecting one or more ions selected from the group consisting of K+, Na+, Cl, NH3, Ca2+, S2−, Ag+, Pb3+, Pb4+, NO2−, NO3−, CN, F, and combinations thereof.

11. The system of claim 1, wherein the one or more analytes comprise a metal.

12. The system of claim 11, wherein the metal is one or more of copper, gold, aluminum, nickel, chromium, nichrome, germanium, silver, titanium, tungsten, platinum, tantalum, and combinations thereof.

13. The system of claim 1, wherein the one or more analytes comprise a non-metal.

14. The system of claim 13, wherein the non-metal is a metal oxide, metal fluoride, nitride, and combinations thereof.

15. The system of claim 1, further comprising a slit hole positioned between a lens and the grating spectrometer to focus a point of light onto the grating spectrometer.

16. The system of claim 15, wherein the lens is configured to focus one of the fluorescence signal or the Raman signal on the electron multiplying charged couple device image plane.

17. The system of claim 15, wherein the slit hole is a 50 micrometer slit hole.

* * * * *